June 27, 1967 H. A. CLOUD 3,328,785

TRANSFLUXOR MEMORY EMPLOYING COMMON READ-WRITE CIRCUITS

Filed Sept. 11, 1963 2 Sheets-Sheet 1

INVENTOR.
HARLEY A. CLOUD
BY George J. Hette
ATTORNEY 3,328,785

TRANSFLUXOR MEMORY EMPLOYING COMMON READ-WRITE CIRCUITS

Harley A. Cloud, Vestal, N.Y., assignor to International Business Machines Corporation, New York, N.Y., a corporation of New York Filed Sept. 11, 1963, Ser. No. 308,222
4 Claims. (Cl. 340—174)

The present invention relates to magnetic memory systems, and, more particularly, to a so-called transfluxor memory and associated circuitry.

In the magnetic memory art an important well-known basic storage element is the transfluxor which consists essentially of a double apertured magnetic core having apertures that are usually of different sizes. Customary arrangements of such multiapertured cores and general theory of operation are set forth and described in an article entitled "The Transfluxor" by J. A. Rajchman and A. W. Lo, published in the Proceedings of the IRE, March 1956, pages 321–332.

Previous known drive schemes for transfluxors have required separate read and write circuits as well as separate logic addresses which is a direct and inherent result of the fact that the two apertures in such a device are different sizes. More particularly, certain difficulties encountered with prior art systems have been that although the read drive tolerance was fully acceptable, the write tolerance was poor and only brought within required limits at the sacrifice of output signal strength.

It is therefore a primary object of the present invention to provide a transfluxor memory system utilizing the same circuits for both reading and writing.

Another object of the invention is the provision of such a system wherein one set of address drivers accomplishes both reading and writing.

A further object of the invention is the provision of a transfluxor system wherein satisfactory write tolerances are achieved with no sacrifice in output signal magnitude.

A still further object of the invention is the provision of such a system having the capability to accommodate overdrive during the write cycle thereby achieving a decreased memory cycle time.

Another object is the provision of a transfluxor memory system as is described in the above objects utilizing two cores per bit and which presents a constant impedance to associated driver apparatus.

Briefly, the invention comprises providing separate means for linking write current pulses to the large aperture and for relating read current pulses to the smaller aperture, the write pulses operating in a first magnetic direction and the read current pulses in the opposite magnetic direction.

The foregoing and other objects, features and advantages of the invention will be apparent from the following more particular description of preferred embodiments of the invention, as illustrated in the accompanying drawings.

In the drawings:

FIGURES 1(*a*) and (*b*) show a transfluxor set to binary "zero" and "one" conditions, respectively.

Figure 1A:
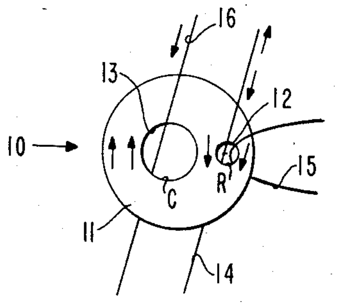
Figure 1B:
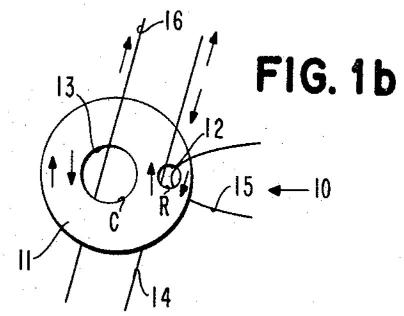

FIGURES 1(*a*) and 1(*b*) illustrate, respectively, a transfluxor memory device 10 in each of its two possible binary magnetic states. Such a device comprises a generally disclike base portion 11 of a magnetic material having a substantially square hysteresis loop characteristic. A pair of apertures pass completely through the body portion with the smaller aperture 12 termed the READ aperture (R) and the larger aperture 13 the CONTROL aperture (C). The transfluxor, for reasons which will be made clear later, is what is termed a non-destructive readout (NDRO) device by which is meant the capability of being read out without removing or changing the magnetic state of the storage element.

A read winding 14 passes through the read aperture 12 and is provided with interrogation current pulses from a suitable source (not shown) of successively different polarities, as shown by the associated arrows. A sense winding 15 is inductively related to the aperture 12 and as will be brought out below, when the magnetic conditions are of a certain type in the body 11, interrogation current pulses on the winding 14 induce corresponding voltage pulses in the sense winding thereby indicating a particular coded binary condition or state.

A write winding 16 passes through the control aperture and is provided with write current pulses from a suitable source (not shown) of sufficient magnitude and duration to set or condition the magnetic material to a particular remanent state regardless of the initial stage in which it resides. Exemplary of this action, in FIGURE 1(*a*) when a write current is passed through the winding 16 in the direction of the arrow, the body 11 is magnetically set so that the remanent flux will have the generally overall clockwise character indicated. Application of interrogation pulses to the line 14 at this time produces insufficient magnetic flux to switch or change appreciably the remanent flux condition created previously by energization of the control winding. When this condition prevails, the transfluxor core 10 is referred to as being in a "blocked" state. On interrogation, little voltage will be induced in the sense line 15 and the device 10 is accordingly considered to represent a binary "zero" condition.

With reference now to FIGURE 1(*b*) and the storage of a "one," a current pulse of sufficient magnitude is passed through the line 16 in the direction shown (opposite that required to set a zero) such that the flux orientation inwardly of the periphery is in one direction whereas that out at the edge is in a contrary one. With a remanent flux state of this character, bi-polar read pulses applied to the read winding 14 can switch the flux around the read aperture which induces a voltage in the sense line 15 of significant magnitude thereby indicating the storage of a "one" in the core.

Several points are important to emphasize at this time in view of their close relation to certain advantages that accrue in the practice of the invention. First of all, the magnitude of the write current is a critical factor in that if excessively large it tends to switch the flux outwardly of the read aperture thereby destroying the "one" condition upon readout, that is, destroying the NDRO characteristic. A second item of considerable influence on drive circuitry requirements is that a much larger tolerance exists for the read current than for the write current due to the relatively large size of the control aperture over that of the read aperture (frequently in the order of 3:1). Accordingly, it has been considered necessary in previous systems to use separate read and write drivers since the amplitudes required for the read and write pulses are a function of the respective aperture sizes.

One form of generalized conventional circuit instrumentation utilizing a transfluxor device is that shown in ;URE 2. A write driver 17 is provided for passing bi- ar write current pulses along a write winding 18 which ses through the control aperture 19 of a transfluxor 20. ilarly, a read driver 21 supplies interrogation current ses of both polarities to a read winding 22 which is :ed with the read aperture 23 of the device, and as ore a sense winding 24 is also threaded through the d aperture. An important addition here over the de- iption given on behalf of FIGURE 1 is the inclusion an inhibit winding 25 which is inductively related to control aperture and furnished with current from a :able inhibit driver 26. It is the purpose and function the inhibit apparatus to prevent the setting up of a ıe" condition in the device 20 at certain times such where a plurality of such devices are arranged with nmon driving windings and it is desired to set up only tain of the magnetic elements, in which case the others prevented from being set up, or in a manner that will described.

Prior to actual use of a storage arrangement as in FIG- RE 2, it is necessary to preset new transfluxor elements a common reference condition in order to obtain uni- m responses during subsequent reading and writing erations. This is accomplished here by passing a rela- ely large current pulse through the inhibit winding iich serves in this manner to initialize each of the asso- ited cores to a similar state.

Figure 2:
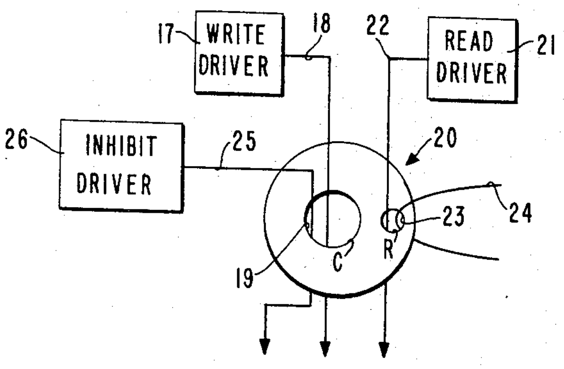
FIGURE 2 illustrates a simplified transfluxor memory system of conventional design.
Figure 3:
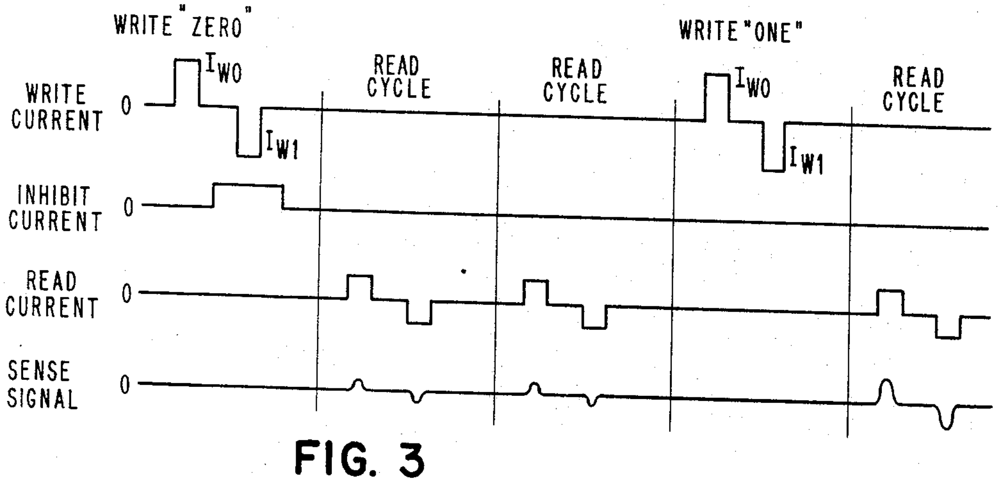
FIGURE 3 is a graph of actuating current pulses and relative timing thereof for the system of FIGURE 2.

For a clear understanding of the operation of the system FIGURE 2 reference should now be made to the pulse ttern and timing graph of FIGURE 3. The write cur- it consists of a positively directed square wave pulse, licated as I*w*0, followed by a negatively directed pulse 1. The designation I*w*0 refers to the fact that the pulse :s the transfluxor to a binary "zero" condition, and the 1 pulse sets the device to the binary "one" state. These ite pulses can be considered to have a magnitude of 2I r present purposes. Assume that it is desired to write a ero" into the device, then the I*w*0 write pulse sets the vice to the "zero" remanent condition and at the time e I*w*1 pulse is present on the write winding 18 a posi- 'e inhibit current pulse is established in the inhibit wind- g 25 of a magnitude equal to I. The inhibit current rves to reduce the effective writing capability of the I*w*1 rrent in the write winding to below the amount that ould switch the transfluxor to the "one" state and thus e transfluxor remains in the "zero" condition. On sub- quent read cycles, interrogation by paired pulses of con- cutively different polarity and individual magnitudes ual to I produces very slight inductive effect on the nse winding 24 which no-signal condition is equivalent a binary "zero" state.

When it is desired to write a "one" into the transfluxor e inhibit winding is passive and the write current as efore provides, consecutively, I*w*0 and then I*w*1 cur- nt pulses. At this time since there is no inhibiting fect the I*w*1 pulse switches the core in the manner de- :ribed previously and the transfluxor is correspondingly t to the "one" state, or the condition shown in FIG- RE 1(*b*). A subsequent read cycle produces significant iduced voltage signals in the sense winding 24 with ie result of a "one" condition being indicated by the resence of the induced voltage pulses.

Figures 4, 6:
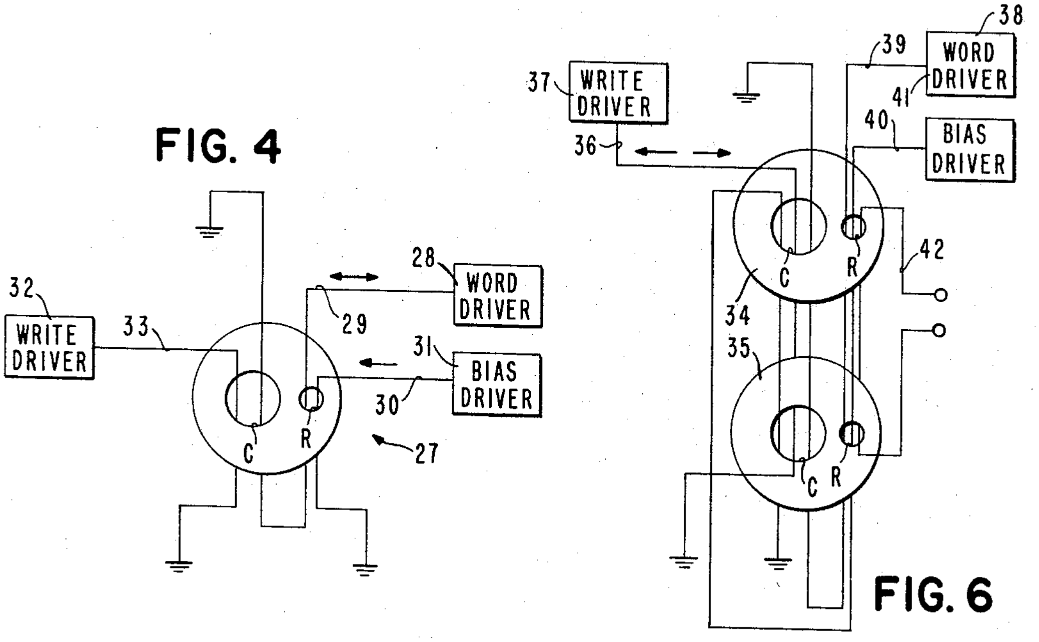
FIGURE 4 represents a schematic diagram of one form of the invention.
FIGURE 6 is a further form of the invention utilizing two transfluxor cores per information bit.

In FIGURE 4 there is shown a first embodiment of ie invention as applied to a single transfluxor element 7. A word driver 28 provides paired bi-polar pulse iformation of a character similar to that provided by ie rear driver 21 above. A single word drive winding 9 is threaded through the read aperture R and back ırough the control aperture C in a single path with one nd of the winding operatively related to the driver 28 nd the other end ground referenced. A bias winding 0, also threaded through the read aperture and rounded at one end, is provided with negative bias ulses from a suitable driver 31. Write driver 32 supplies current pulse energy to a write winding 33 which passes through the control aperture to ground.

Each of the current pulses furnished by the word driver 28, bias driver 31 and write driver 32 are of substantially the same magnitude, which is less than the control aperture threshold current, that is, that magnitude of current which will initiate irreversible switching of the flux about a particular aperture. The primary function of the bias driver is to provide current pulses at such times as to inhibit the positive read pulses from switching in those portions of the core lying outwardly of the read aperture.

Figure 5:
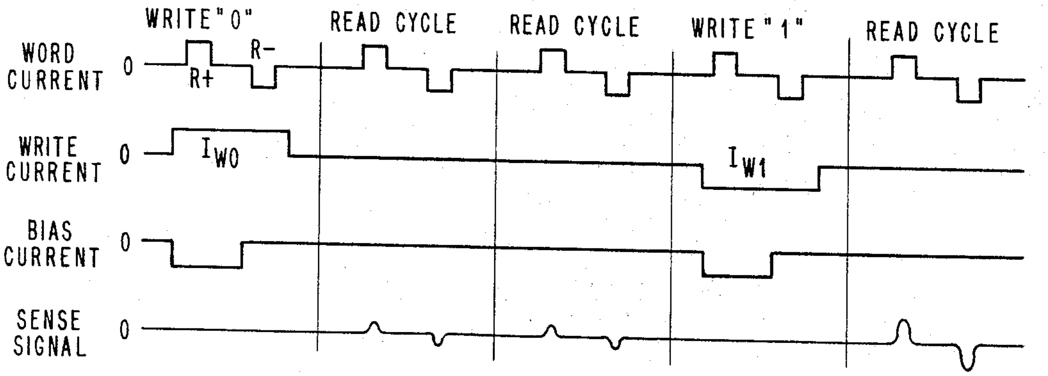
FIGURE 5 is a timing diagram of use in understanding the system of FIGURE 4.

The timing and current graph of FIGURE 5 illustrates the detailed read-write operation of the system of FIGURE 4. To write a "zero" it is required that a full coincidence of the bi-polar word current pulses and a positive write current pulse I*wo* exists. Also, coincident with the positively going word current pulse there is provided a negative bias current pulse for preventing possible switching outwardly of the read aperture as already noted. With core 27 now in a blocked condition the application of word current pulses R+ and R− fail to induce significant voltages in the sense winding and accordingly a binary "zero" is said to be set in the core.

To write a "one," the word current bi-polar pulses are applied to the line 29 and a negative write current pulse I*w*1 is provided on line 33 which exists and extends in overlapping relation to the two word pulses. Also, a negative bias current pulse is supplied which is coexistent with merely the positive word current pulse R+. This combination of currents effects a switching of the transfluxor such that application of the word current read pulses R+ and R− induces in the sense winding sufficient amounts of voltage to indicate the "one" condition. It is important to note in this regard that the "zero" is written into the transfluxor during the existence of the positive word current pulse, whereas the "one" is written during the negative word current pulse time.

The bias pulse serves the important function during the write "zero" cycle of cancelling out the effect of the positive word current pulse in the read aperture, which otherwise if there had previously been a "one" stored in the core the flux would be switched by the positive pulse and a partial "one" would be set up in the core.

It will be noted that no separate sense winding was provided as was done in the case of the prior art structure. Although this can be done here, it is not necessary since the bias winding 30 is not used during read cycles and can be used as a sense winding at this time by appropriate switching. Whether to use the bias windings in this manner or provide separate sense windings is a practical matter for determination in a given application, the choice being made from consideration of the relative costs of providing the additional windings as compared to that for switching means to accommodate the bias windings to the dual role.

The write "one" tolerance for the current pulse magnitude according to the arangement described immediately above has been increased considerably over that of FIGURE 2 since the negative word current pulse acting on the read aperture prevents switching of flux in the portion of the core lying immediately adjacent the outer periphery until the current through the control aperture is in excess of approximately three times the unit of current, i.e. 3I. Actual measured tolerance in this regard has shown an increase from ±1% from, say, a system as in FIGURE 2, to greater than ±15% with no sacrifice in output signal for a configuration as in FIGURE 4.

A further embodiment of the invention offering additional advantages particularly in regard to presenting constant impedance to the current driving means throughout the different operations is the system illustrated in FIGURE 6. This configuration is generally similar to that of FIGURE 4 but differs most basically in that two cores per bit of stored information are used. In this connection, it is fundamental to the operation that one of the cores for each information bit always contains a "one" and in this way the word driver switches the same number of memory devices in each case, or phrased slightly differently it sees a constant load at all times. As will be made clearer this arrangement increases the one/zero sense signal ratio thereby enhancing reliability of performance.

A pair of transfluxor cores 34 and 35 both have their control apertures linked by a common write winding 36. A write driver 37 feeds one end of the winding 36 the other end of which is referenced to ground. A word driver 38 supplies bi-polar pulses to word line 39 which is threaded through the read aperture of transfluxor 34, read aperture of transfluxor 35, back through control aperture 35 and control aperture of core 34 to ground. Similarly, a bias winding 40 furnished with bias pulses from a driver 41 is passed through the read aperture of core 34, read aperture of core 35, back through control aperture of core 34 and control aperture of core 35 to ground.

A separate sense winding 42 is shown here which may be preferable under certain circumstances where it is not feasible or desirable to use additional switching apparatus to change from a bias function to a sense function as was described in relation to the first embodiment. However, in certain circumstances the aforedescribed technique may be preferable.

Figure 7:
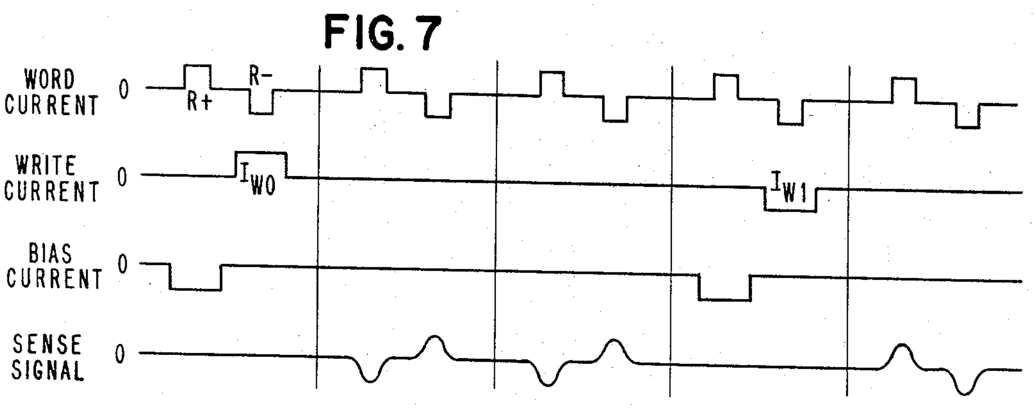
FIGURE 7 is a current pulse timing graph identified with the system of FIGURE 6.

Turning to FIGURE 7, and the details of operation, writing a "zero" is seen to be accomplished by coinciding a negative-going bias current pulse with the positive word pulse and a positive write pulse, Iwo, with the negative word pulse. By tracing the negative bias and word current lines it is seen that the effect of each on the read aperture is cancelled by the other, but are additive in effect at the control aperture. However, the negative word pulse and the coinciding positive write pulse although canceling each other at the control aperture of core 34, are in reinforcing relation at the control aperture of core 35. Thus, core 34 is at the "zero" condition whereas core 35 is at the "one" condition. On reading, a positive read pulse on winding 39 will induce a negative voltage signal in the sense winding 42 via the core 35 which is in the "one" state, and similarly a negative read pulse generates a positive sense signal. Accordingly, a "zero" binary condition for the device of FIGURE 6 is represented by a negative sense signal followed by a positive one for each read cycle, that is, the particular sequence of pulses defines the binary condition and not the mere presence or existence of a signal.

To write a binary "one" in this system a negative bias current is applied at the same time as the positive word current pulse, and a negative current pulse, Iw1, coincides with the negative word current pulse. In a manner similar to that described immediately above, the core 34 switches to a "one" condition and the core 35 to a "zero," Application of the paired positive-negative interrogation word pulses during a subsequent read cycle provides a positive sense signal for the positive read pulse followed by a negative sense signal for the negative read pulse. Accordingly, a "one" condition is represented here in coded form by a positive sense signal followed by a negative one. Thus, it is important to emphasize that whereas the magnitude alone of the sense pulses were indicative of the binary condition in the system of FIGURE 4, in that of FIGURE 6 polarity sequence is the indicium. This is an important advantage in providing a considerably improved zero/one indication which is reflected in hardware savings and overall reduction in complexity.

In each of the described forms of the invention the electrical energy sources of supply have been contemplated as being constant current sources. However, it is clear that a fully satisfactory memory system can be constructed according to the precepts of the invention with such sources being of the constant voltage variety. Choice in this matter would be dictated by other factors more directly associated with the actual data processing system, for example, in which such a memory system is to be used.

Each of the systems of FIGURES 2, 4 and 6 are of t general type of memory referred to as linear-selecti memories, or frequently word-organized memories, as d tinguished from so-called coincident-current memories. this class of memory systems the memory cores are ranged in sets of planes, called bit planes, with the co of each plane being positionally identified in X–Y coo dinate manner. Similarly coordinated cores of the plan are set to their different binary states by common dri windings, where all such similarly coordinated cores co stitute a word. And it is particularly in connection wi word organized memories that the present invention e hibits its most advantageous utility.

Comparing the invention to the more conventional tran fluxor arrangement of FIGURE 2, it is to be noted fir that that the usual requirements for a transfluxor memo would be two (2) drivers per word since the two apertur are of different sizes necessitating different drivers for eac size aperture. Exemplary of this, in the case of a 4,09 word transfluxor memory utilizing the basic configuratic of FIGURE 2 there would be required 8,192 drivers c some sort to operate such a memory. However, by appl cation of the teachings of the present invention the nun ber of drivers can be reduced to 4,096, one per word c storage, with the mere addition of a few bias drivers whic do not require selection apparatus since they can be actu ated on a per-plane basis.

While the invention has been particularly shown an described with reference to preferred embodiments thereo it will be understood by those skilled in the art that th foregoing and other changes in form and details may b made therein without departing from the spirit and scop of the invention.

What is claimed is:

1. A magnetic storage system, comprising:

magnetic material having rectangular hysteresis charac teristics provided with a pair of different sized aper tures passing completely therethrough;

a common word drive winding linking both opening of said material;

a write drive winding linked with a larger of said open ings;

a bias drive winding magnetically related to the smalle of said openings;

electric energy source means connected to said wor drive winding for providing consecutive paired bi polar current pulses thereto during each read and write cycle;

electric pulse generating means connected to said write drive winding for providing single current pulse thereto in time coincidence with the word current pulses during write cycles and overlapping therewith, said write pulses being of a first polarity for writing in combination with a first of said current pulses in said word drive winding a binary zero, and a second polarity for writing in combination with a second of said pulses in said word drive winding a binary one; and bias current source means connected to said bias winding for selectively providing bias current in timed coincidence with said current pulses in said word drive winding during each write cycle for preventing the overriding of predetermined flux condition in those portions of the magnetic material disposed outwardly of the apertures during storage.

2. A magnetic storage system in accordance with claim 1, in which said bi-polar word drive current pulses are sequentially positive and negative pulses:

said write drive pulse is coincident with said positive and negative word drive signals during said write cycle, said write drive pulse being positive during a binary zero write cycle and negative during a binary one write cycle; and said bias current is a negative pulse coincident only with said positive pulse of said word drive pulse during each of said write cycles.

A linear-selection memory system utilizing two cores information bit where each core is a transfluxor type ;netic core having a large opening and a small open- comprising:

word drive winding linking the small openings of the first and second cores in a first magnetic relation and the large openings thereof in a second magnetic relation;

write drive winding linking the large openings of the first and second cores in different magnetic relations;

biasing winding threading said large and small openings of said first and second cores;

aid bias winding linking said small openings of said cores in said first magnetic relation and said large openings in reverse of said second magnetic relation;

lectric source means connected to said word drive winding for providing consecutive paired bi-polar current pulses thereto during each read and write cycle;

:lectric pulse generating means connected to said write drive winding for selectively providing single current pulses thereto in timed coincidence with one of said word current pulses during said write cycle;

;aid write pulse being of a first polarity and in coincidence with said one of said word drive pulses for simultaneously switching said first core to a binary one and said second core to a binary zero, and of a second polarity in timed coincidence with said one of said word drive pulses to oppose switching of said first core to a binary one and said second core to a binary zero;

bias current source means connected to said bias winding for selectively providing a bias current pulse in timed coincidence with said first current pulse of said word drive winding for preventing the overriding during switching of a predetermined flux condition in those portions of said transfluxors disposed outwardly of the apertures thereof and with the second of said current pulses of said word drive winding for simultaneously switching said first core to a binary one and said second core to a binary zero; and means for sensing successive bi-polar readout signals from said transfluxor during said read cycle of said energizing word drive source.

4. A linear memory system in accordance with claim 3, in which said word drive current pulses are successively positive and negative for each of said write and read cycles:

said write current pulse is a positive pulse coincident only with a negative word pulse in a write cycle in which said first and second cores are switched to binary zero and one states, respectively, and is a negative pulse coincident only with a negative word drive pulse in a write cycle in which said first and second cores are switched to binary one and zero states, respectively; and said bias pulse is a negative pulse coincident only with a positive word drive pulse for switching said first and second cores to binary zero and one states, respectively, in each write cycle.

References Cited

UNITED STATES PATENTS 3,155,943 11/1964 Markowitz ---------- 340—174

OTHER REFERENCES

Pages 112–117, January 1961, "Computer Memories a survey of the State-of-the-Art," by Rajchman, Proceedings of the IRE.

BERNARD KONICK, *Primary Examiner.*

S. M. URYNOWICZ, *Assistant Examiner.*